No. 897,950. PATENTED SEPT. 8, 1908.
J. L. WOODBRIDGE.
SYSTEM OF ELECTRICAL DISTRIBUTION.
APPLICATION FILED JAN. 20, 1908.
2 SHEETS—SHEET 2.
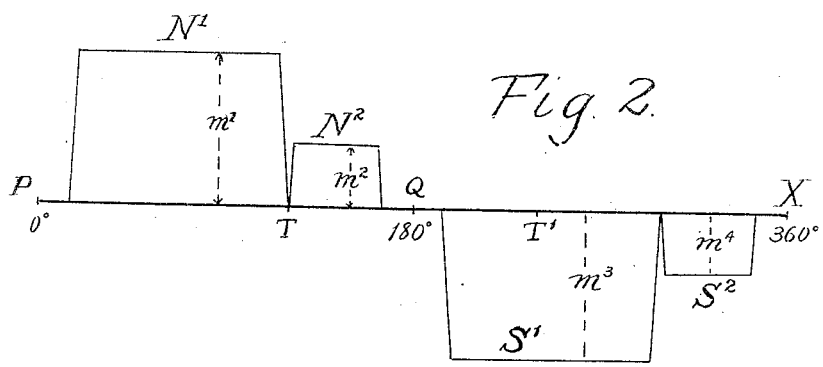
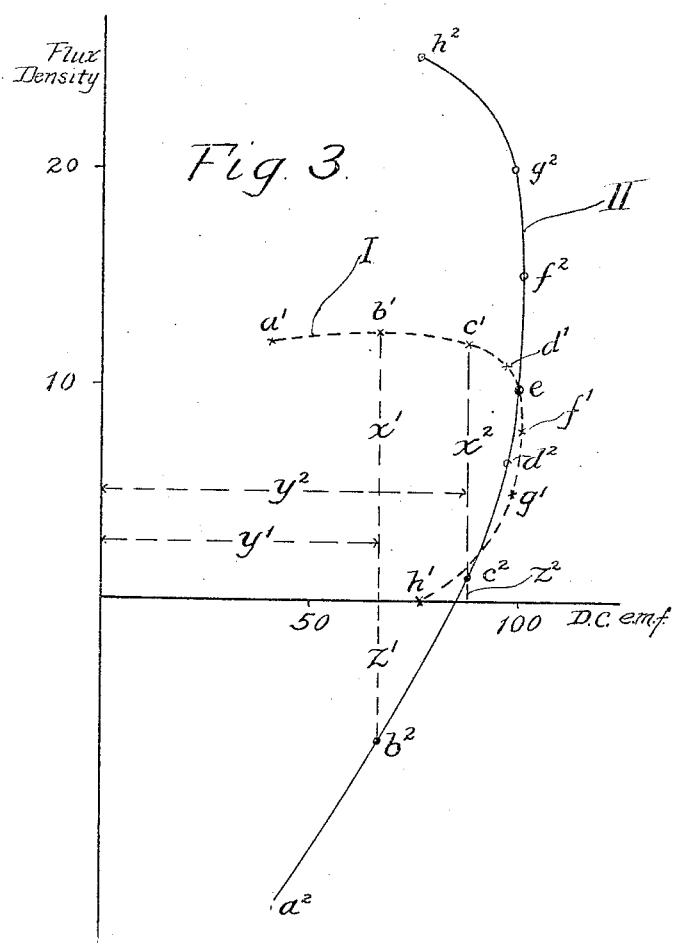
WITNESSES:
INVENTOR
Joseph L. Woodbridge
BY
Augustus B. Stoughton
ATTORNEY

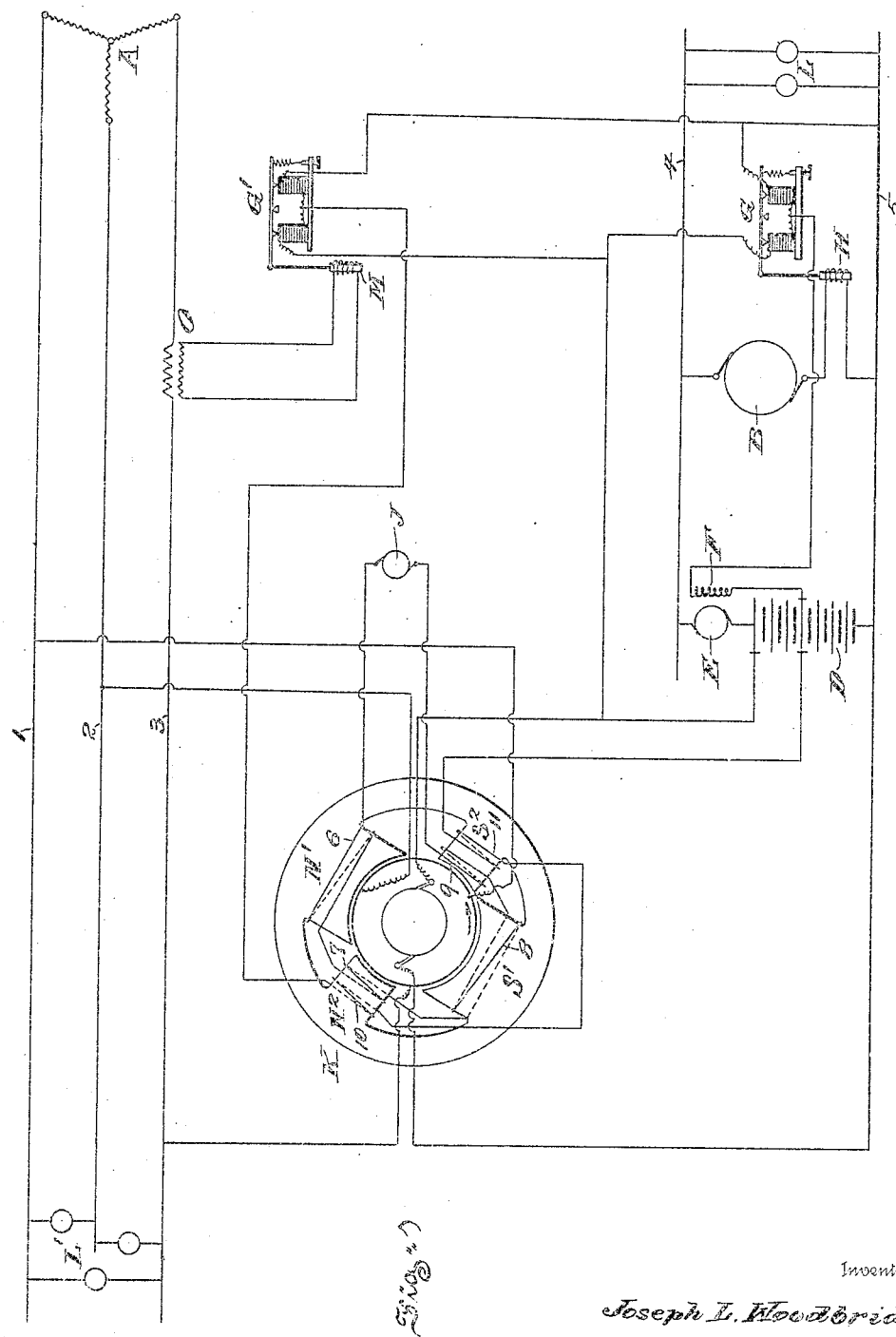

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 897,950.    Specification of Letters Patent.    Patented Sept. 8, 1908.

Application filed January 20, 1908. Serial No. 411,570.

*To all whom it may concern:*

Be it known that I, JOSEPH LESTER WOODBRIDGE, a citizen of the United States, and resident of Philadelphia, in the county of Philadelphia and State of Pennsylvania, have invented a certain new and useful System of Electrical Distribution, of which the following is a specification.

My invention relates to systems of distribution in which an alternating current circuit and a direct current circuit are interconnected by means of transforming apparatus designed to transfer energy automatically in either direction between the two circuits.

One of the objects of my invention is to provide simple, inexpensive, efficient and quick acting means for effecting such transfer.

Other objects as well as the general nature and scope of the invention will be more clearly understood by reference to the following description taken in connection with the accompanying drawings, forming part hereof, and in which Figure 1, is a diagrammatic representation of apparatus embodying the invention. Fig. 2, is a diagram showing a certain distribution of field flux in the rotary converter shown in Fig. 1, and Fig. 3, are plotted curves showing the relative field strengths of the poles of the above mentioned converter to give certain variations of its electromotive-force.

Referring to Fig. 1, A, is a source of alternating current connected to the three phase circuit 1, 2, 3, supplying a varying alternating current load $L^1$. B, is a source of direct current connected to the direct current circuit 4, 5. Connected to the circuit 4, 5, is also shown a storage battery D, with its booster E, also translating devices L constituting a fluctuating direct current load. The booster E, is controlled by its field coil F, which is connected to the carbon regulator G, whose solenoid H, is connected into the circuit of the generator B. This apparatus operates in the usual manner to cause the battery to take the fluctuations of the direct current load L. It is well known in the art and need not be further described here. Connected between the alternating current circuit 1, 2, 3, and the battery terminals is shown a rotary converter K. The armature of this machine is constructed in the usual manner, but the poles are of special design for permitting a variation in the ratio between the alternating current and direct current voltage developed in the armature. As here shown the machine is a bi-polar machine, the principal poles being indicated at $N^1$ and $S^1$. In addition to these principal poles auxiliary poles $N^2$ and $S^2$ are shown, which constitute an auxiliary path for the magnetic flux in parallel with the main poles. Before further describing the details of construction and the method of operation of this converter reference will now be made to Figs. 2 and 3 to explain more clearly the theory of its operation.

In Fig. 2, the line P—X represents the developed armature periphery of the converter, the direct current brushes being located at P and Q, while the alternating current taps are taken off at points P, T, $T^1$. The ordinates $m^1$, $m^2$, $m^3$ and $m^4$, represent the field strength at various points on the armature periphery with a certain distribution of field flux, and it is possible to determine by Fournier's theory the magnitude of the fundamental wave of alternating electro-motive-force developed in the armature winding between any two taps, as for example, between P and T, in terms of these ordinates, when the armature is revolved at a given speed. By making this fundamental wave constant in magnitude a series of relative values can be determined for the field strengths of the main poles $N^1$ and $S^1$ and of the auxiliary poles $N^2$ and $S^2$. In Fig. 3, such relative values have been plotted in the form of curves, based on the relative lengths of pole arc shown in Fig. 2.

In Fig. 3, two curves are shown, curve I corresponding with the main pole $N^1$ and curve II, corresponding with the auxiliary pole $N^2$. The upper branch of curve I from $a^1$ to $e$ corresponds with the lower branch of curve II from $a^2$ to $e$, the two curves crossing at the point $e$. The ordinates of any two points such as $b^1$ and $b^2$ on the corresponding branches of these two curves and having a common abscissa correspond to the field strengths necessary in the poles $N^1$ and $N^2$ to produce the assumed fundamental wave of alternating electro-motive-force, this wave as stated above being constant for all corresponding points on these two curves. The abscissæ of these curves represent the corresponding direct current electro-motive-force developed between the direct current brushes Thus if the main poles be excited to strength corresponding to the ordinate $x^1$ and the auxiliary poles to a strength corresponding with the ordinate $z^1$, (which being negative indicates the opposite polarity) the direct current electro-motive-force will correspond with the abscissa $y^1$. If, now the main poles be excited to a strength corresponding with the ordinate $x^2$ and the auxiliary poles to a strength corresponding with the ordinate $z^2$ (which in this case is positive indicating the same polarity as the main poles), the direct current voltage will correspond with the abscissa $y^2$. In both cases, however, the fundamental wave of alternating electro-motive-force between the three phase taps will be the same.

From the curves shown in Fig. 3, it will be seen that a considerable range of direct current voltage can be produced with a constant alternating current electro-motive-force by properly varying the excitation of the main and auxiliary poles. It will, furthermore, be seen that to accomplish this under conditions corresponding with the branches $eh^2$ and $eh^1$, it is necessary to vary the excitation of both main and auxiliary poles in opposite directions and by very considerable amounts. It will be noted, however, that by following the other two branches of the curves, viz: $ea^1$ and $ea^2$, very little change is necessary in the excitation of the main pole. This is particularly true between the points $a^1$ and $c^1$ on curve I, between which points the strength of the main pole is very nearly constant for a wide range of variation in the direct current voltage. The corresponding portion of curve II, that is, the portion between $c^2$ and $a^2$, lies almost wholly below the axis of reference, indicating a field strength of opposite polarity in the auxiliary poles to that of the main poles. As a result of the above analysis, it follows that the converter with poles designed as shown on Fig. 1, with the main poles constantly excited and the auxiliary poles subject to excitation varying from about zero to a maximum and of the opposite polarity may be made to develop a practically constant alternating current electro-motive-force with a widely varying direct current electro-motive-force.

Returning now to Fig. 1, field circuits are shown on the converter K, designed to accomplish results above described. A field winding 6, 7, 8, 9, is shown on both the main and auxiliary poles to which a constant potential is applied from the exciter J, producing a field strength of say north polarity in the main pole $N^1$ and of south polarity in the auxiliary pole $N^2$, south polarity in the main pole $S^1$ and north polarity in the auxiliary pole $S^2$. This excitation alone would correspond to the ordinates $x^1$ and $z^1$ in Fig. 3, producing a direct current electro motive force midway between the extreme maximum and the extreme minimum desired. A second field winding 10, 11, is shown, wound only on the auxiliary poles $N^2$ and $S^2$ and controlled by the carbon regulator $G^1$. The variations of pressure produced on the carbon regulator by the solenoid M will send current in either direction through this auxiliary field winding, thus increasing or decreasing the strength of the auxiliary poles, producing a corresponding decrease or increase in the direct current electro-motive-force without changing the alternating current electro-motive-force of the converter. The solenoid M is energized by current taken from the secondary of a current transformer O, whose primary is connected in series with conductor 3, of the alternating current circuit. Small variations of current in this current transformer will, therefore, act upon the carbon regulator in such a way, as to produce a flow of current in the auxiliary field winding 10, 11, to vary the direct current voltage of the exciter K, thus causing it to receive energy from or deliver energy to the battery. The adjustment may be made such that upon an increase of load on the alternating current circuit due for example to the translating devices $L^1$, a small portion of this increase getting back to the source A, through the current transformer O, will by the action of the carbon regulator cause the converter K to take energy from the battery and deliver it to the alternating current circuit, thus relieving the source A of the greater part of the fluctuations.

The varying excitation of the auxiliary poles $N^2$ and $S^2$, produces another result besides that above described. While this change of excitation does not vary the amount of the alternating electro-motive-force it does shift its phase position. This shifting of the phase position will have a tendency to transfer energy between the converter armature and the alternating current circuit. If these auxiliary poles are properly located with reference to the main poles and the direction of armature rotation, this effect may be made to materially assist the transfer of energy between the battery and the alternating current circuit. If, however, the auxiliary poles are located on the opposite side of the main poles, the effect will be to retard such transfer of energy.

In Fig. 1, the auxiliary poles are shown as trailing poles, the direction of armature rotation being indicated by the arrow. This is the proper location of these poles to assist in the automatic transfer of energy. An increase in field strength of the auxiliary poles of a polarity opposite to that of the main poles corresponds with a reduction in the direct current voltage as shown in Fig. 3, and therefore with a transfer of energy from the battery to the converter. This same increase in auxiliary pole field strength it being of opposite polarity to that of the main poles, will shift forward the phase of the alternating electro-motive-force of the converter, thus causing the converter to deliver energy to the alternating current circuit. When energy is transferred from the battery to the alternating current circuit as described above the battery voltage will drop. This would create a tendency to take additional current from the generator B, but a small amount of increase in output from the generator B acting upon the carbon regulator G by means of the solenoid H will immediately increase the voltage of the booster E to correspond with the drop in battery voltage, and prevent further flow of current from the generator B into the battery.

What I claim is:

1. In combination an alternating current circuit, a direct current circuit, transforming apparatus including a rotary converter connected between them, and means responsive to changes of electrical condition on the alternating current circuit and adapted to vary the distribution of field flux around the periphery of the converter armature.

2. In combination an alternating current circuit, a direct current circuit, an armature with its commutator and brushes adapted to develop both alternating current and direct current electro-motive-forces operatively connected between the two circuits, a field structure providing for the magnetic flux which influences each section of the armature between adjacent brushes, two paths constituting a main and an auxiliary pole, means for constantly exciting the main poles, and means responsive to changes of electrical condition of the alternating current circuit for variably exciting the auxiliary poles.

3. In combination an alternating current circuit, a direct current circuit, an armature with its commutator and brushes adapted to develop both alternating current and direct current electro-motive-forces operatively connected between the two circuits, a field structure providing for the magnetic flux which influences each section of the armature between adjacent brushes, two paths constituting a main and an auxiliary pole, means for constantly exciting the main poles, means for producing constant excitation of each auxiliary pole of the opposite polarity to that of the corresponding main pole, and means responsive to the electrical condition of the alternating current circuit and adapted to apply a varying excitation to the auxiliary poles.

4. In combination an alternating current circuit, a direct current circuit, an armature provided with commutator, brushes and alternating current terminals operatively connected between the two circuits, a field structure providing for the magnetic flux which influences each section of the armature between adjacent brushes, two parallel paths constituting a main and an auxiliary pole, whereof the auxiliary pole is the trailing pole, means for constantly exciting the main poles, and means responsive to changes of electrical condition of the alternating current circuit for varying the excitation of the auxiliary poles.

5. In combination an alternating current circuit, a direct current circuit, an armature provided with commutator, brushes and alternating current terminals operatively connected between the two circuits, a field structure providing for the magnetic flux which influences each section of the armature between adjacent brushes, two parallel paths constituting a main and an auxiliary pole whereof the auxiliary pole is the trailing pole, means for constantly exciting the main poles, means adapted to apply to each auxiliary pole an excitation of the opposite polarity to that of the corresponding main pole, and means responsive to the electrical condition of the alternating current circuit and adapted to vary the excitation of the auxiliary poles.

6. In combination an alternating current circuit, a direct current circuit, an armature with its commutator, brushes and alternating current terminals operatively connected between the two circuits, a field structure providing for the magnetic flux which influences each section of the armature between adjacent brushes, two paths constituting a main and an auxiliary pole, means for constantly exciting the main poles, means for producing constant excitation of each auxiliary pole of a polarity opposite to that of the corresponding main pole, field windings on the auxiliary poles, and electro-responsive means for varying and reversing the current in said field windings.

7. In combination an alternating current circuit, a direct current circuit, a storage battery, an armature with its commutator and brushes connected directly across the battery terminals, a field structure for said armature, means responsive to the electrical condition of the alternating current circuit for applying to said field structure a variable excitation to cause said armature to receive and deliver energy from and to the battery, means for transmitting energy between the armature and the alternating current circuit, connections including an appropriate booster between the battery terminals and the direct current circuit, and means responsive to the electrical condition of the direct current circuit for controlling the booster.

8. In combination an alternating current circuit, a storage battery, an armature with commutator, brushes and alternating current terminals, whereof the brushes are connected directly across the battery terminals and the alternating current terminals are connected to the alternating current circuit, a field structure for the armature providing a plurality of paths for the magnetic flux which influences each section of the armature between adjacent brushes, and means responsive to the electrical condition of the alternating current circuit and adapted to vary simultaneously the total magnetic flux and its relative distribution between the several paths.

In testimony whereof I have hereunto signed my name.

JOSEPH LESTER WOODBRIDGE.

Witnesses:
W. J. JACKSON,
FRANK E. FRENCH